United States Patent [19]
Davis et al.

[11] 4,428,241
[45] Jan. 31, 1984

[54] ELECTRODE WIRING HARNESS FOR MAGNETIC FLOWMETER

[75] Inventors: James W. Davis, New Britain; Michael E. Dalbey, Warrington, both of Pa.

[73] Assignee: Fischer & Porter Company, Warminster, Pa.

[21] Appl. No.: 318,924

[22] Filed: Nov. 6, 1981

[51] Int. Cl.³ .............................................. G01F 1/60
[52] U.S. Cl. .............................. 73/861.12; 73/861.16
[58] Field of Search ......................... 73/861.12, 861.16

[56] References Cited

U.S. PATENT DOCUMENTS 4,181,018 1/1980 Schmoock ........................ 73/861.12
4,346,604 8/1982 Snook et al. ..................... 73/861.12

Primary Examiner—Charles A. Ruehl
Attorney, Agent, or Firm—Michael Ebert

[57] ABSTRACT

An electrode wiring harness for an electromagnetic flowmeter which includes a non-magnetic metal spool having an insulating liner to define a flow conduit for the fluid to be metered, a pair of electrodes being mounted on the spool at diametrically-opposed positions along a transverse axis which is normal to the axis of the electromagnet assembly. The assembly is excited by a pulsatory wave to establish a magnetic field in the conduit that is intercepted by the fluid to induce a signal in the electrodes as a function of flow rate. The harness is constituted by a printed circuit board connected to the electrodes and disposed in a plane parallel to the electrode axis. The board has a conductive pattern thereon providing wiring from the electrodes to an external converter, the pattern including a loop coaxial with the electromagnet axis, whereby voltages induced therein by the magnetic field are balanced out.

10 Claims, 5 Drawing Figures

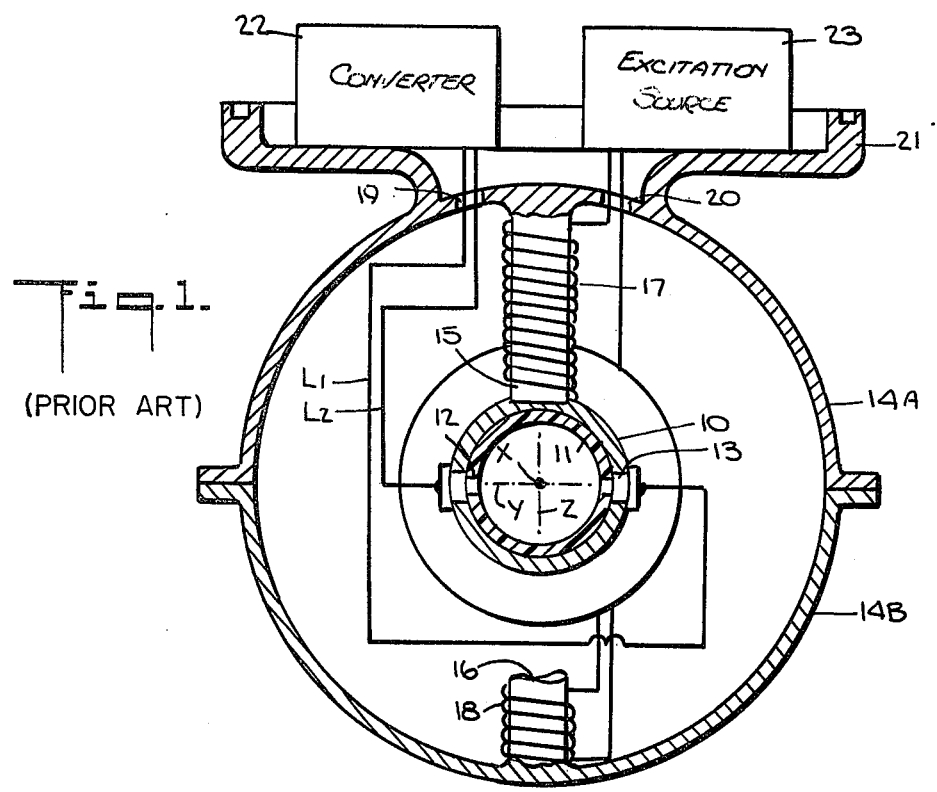
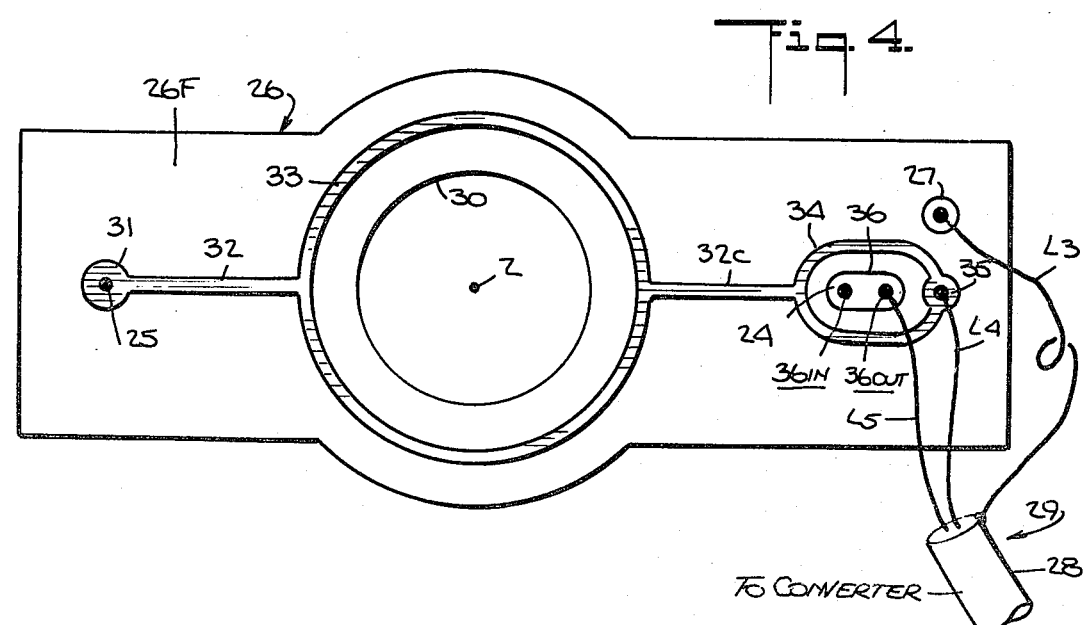
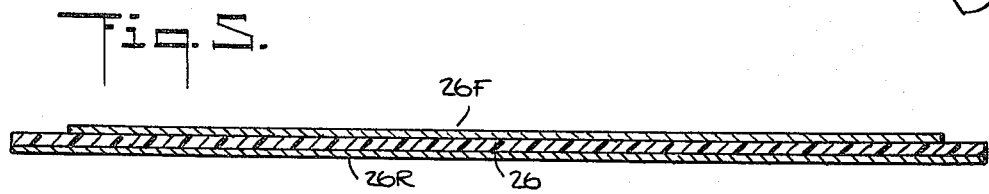

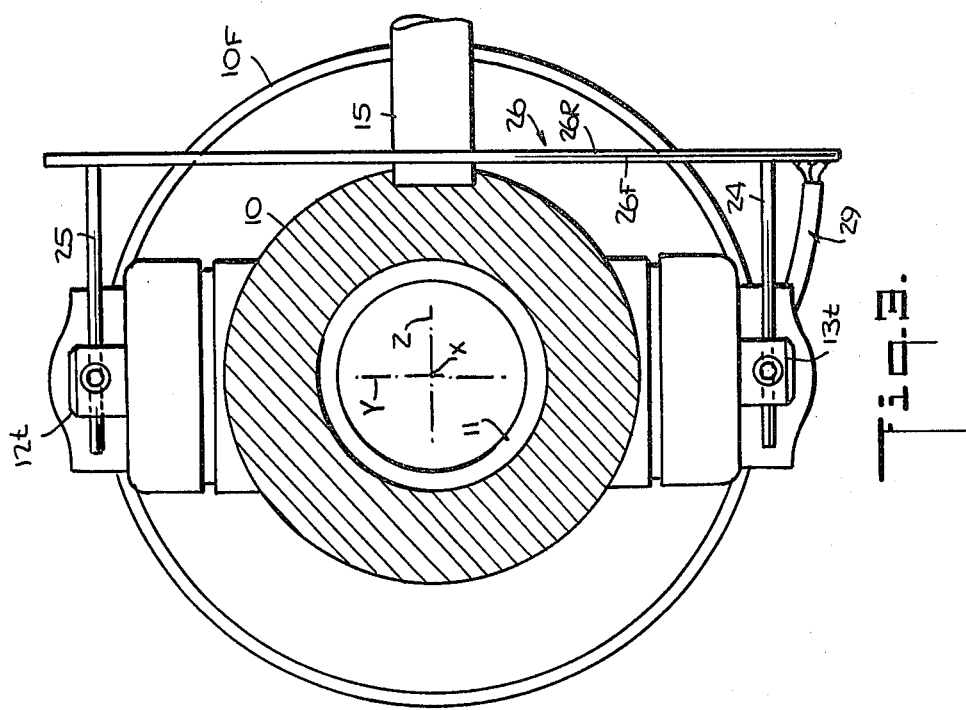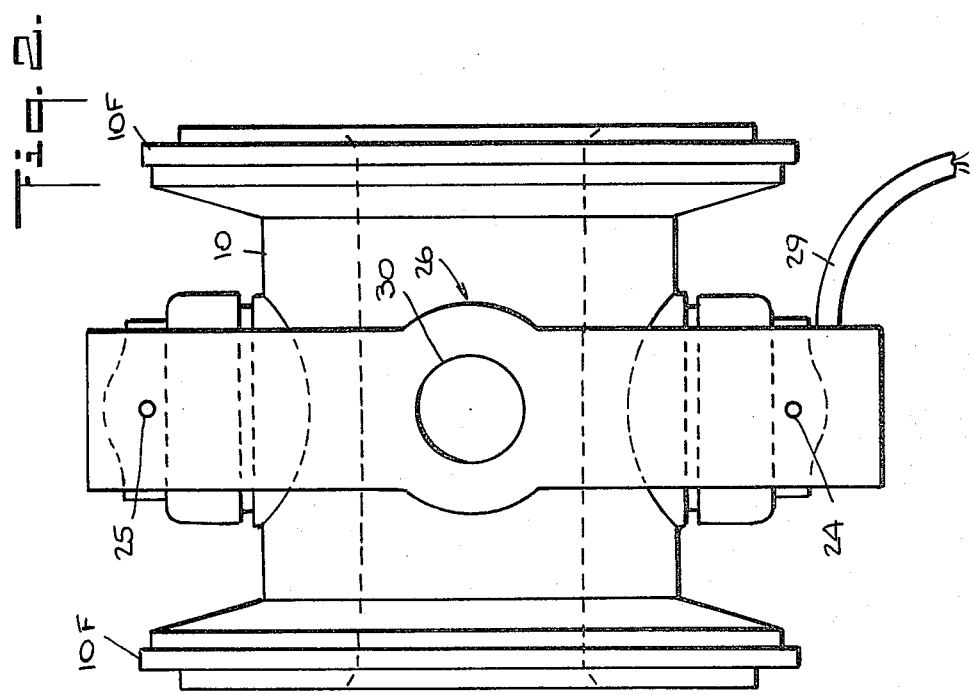

ELECTRODE WIRING HARNESS FOR MAGNETIC FLOWMETER

BACKGROUND OF INVENTION

This invention relates generally to electromagnetic flowmeters, and more particularly to a wiring harness associated with the electrodes of the flowmeter to balance out spurious signals induced in the electrode leads by the magnetic field whereby the signals carried by the leads are only those induced in the electrodes by the flow of the fluid being metered.

Magnetic flowmeters such as those disclosed in U.S. Pat. Nos. 3,695,104; 3,824,856; 3,783,687 and 3,965,783, are especially adapted to measure the volumetric flow rates of fluids which present difficult handling problems, such as corrosive acids, sewage and slurries. Because the instrument is free of flow obstructions, it does not tend to plug or foul. The flowmeter can be used to meter liquids without regard to heterogeneous consistency.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

Typical of commercially-available electromagnetic flowmeters is that unit manufactured by Fischer & Porter Co. of Warminster, Pa. whose Model 10D1430 flowmeter is described in Instruction Bulletin 10D1430A-1- Revision 4. This meter consists of a carbon-steel pipe stool flanged at both ends and serving as a meter body. Saddle-shaped magnetic coils are fitted on opposite sides of the inner surface of the meter body, the magnetically-permeable pipe spool acting as a core or return path for the magnetic field generated by these coils.

The coils in this known form of meter are potted within an epoxy-based compound. An interior liner of neoprene or similar insulating material is inserted within the pipe and turned out against the faces of the mounting flanges. Disposed at the diametrically-opposed positions within the central portion of the meter body are two cylindrical electrodes that are insulated from the pipe the faces of the electrodes being flush with the inner surface of the pipe and coming in contact with the fluid to be metered. Connected to these electrodes and housed in a box external to the pipe are calibration components and a pre-amplifier.

In order to provide a compact and readily installable electromagnetic flowmeter whose weight and dimensions are substantially smaller than existing types, the Schmoock U.S. Pat. No. 4,253,340 disclosed a highly compact flowmeter which, in spite of its reduced volume and weight, is capable of withstanding high fluid pressures.

In the Schmoock flowmeter, use is made of a non-magnetic metal spool of high strength whose inner surface is lined with insulating material to define a flow conduit for the fluid to be metered. The spool also serves to withstand fluid pressure as well as the compressive forces to which the meter is subjected by bolts bridging the flanged ends of upstream and downstream pipes between which the unit is interposed.

Surrounding the Schmoock spool and concentric therewith is a cylindrical housing formed of ferromagnetic material. The housing is provided with annular end plates that are joined to the corresponding end flanges of the spool to define an inner chamber. Integral with the housing are two magnet cores which are placed at diametrically-opposed positions along an axis which is normal to the longitudinal axis of the housing coils being wound on these cores. A pair of electrodes are mounted on the spool at diametrically-opposed portions along a transverse axis at right angles to the core axis. The inner chamber is filled with a potting compound to encapsulate the electromagnets and the electrodes, the housing serving as a mold for this purpose.

In operation, the electromagnets are excited by a pulsatory wave which establishes a magnetic field in the flow conduit that is intercepted by the fluid flowing therethrough to induce a signal in the electrodes which depends on the flow rate, this signal being conveyed by electrode leads to an external converter on secondary.

In order to prevent spurious signals from being induced in the electrode leads, it is essential in an electromagnetic flowmeter that the leads, when they run individually from the electrodes, be located as precisely as possible in a plane containing both electrodes and the axis of symmetry of the electromagnetic assembly. When the individual leads are so oriented, then the voltages induced in the two leads will be of equal amplitude and of opposite phase, so that the effect of the magnetic field in the electrode leads is balanced out; hence in the absence of fluid flow, there will be a zero signal output. It is also essential that the leads be electrostatically shielded to prevent stray pick-ups.

Within the tight confines of a Schmoock type electromatnetic flowmeter, there is insufficient room to run individual leads in the required plane to cancel out the influence thereon of the magnetic field. While it is possible to compensate for the spurious signal produced by the magnetic field, this complicates the arrangement and adds to the cost of the flowmeter.

SUMMARY OF INVENTION

In view of the foregoing, the main object of this invention is to provide a simple and inexpensive printed circuit arrangement for wiring the electrodes of an electromagnetic flowmeter to an external converter, which wiring arrangement acts to cancel out voltages induced therein by the magnetic field, whereby the signal yielded by the flowmeter is not affected by the magnetic field at maximum flow or in the absence of flow.

More particularly, it is an object of the invention to provide a printed circuit board acting as a wiring harness for an electromagnetic flowmeter of the type in which the electromagnetic assembly and the electrodes are encapsulated in a potting compound, which printed circuit is also embedded therein.

Another significant feature of the invention is that the printed circuit board acts as an electrostatic shield for the wiring harness. Also an object of the invention is to provide a wiring harness of the above type which can be installed without the use of expensive tooling and time-consuming assembly techniques.

Briefly stated, these objects are attained in an electrode wiring harness for an electromagnetic flowmeter which includes a non-magnetic metal spool having an insulating liner to define a flow conduit for the fluid to be metered, a pair of electrodes being mounted on the spool at diametrically opposed positions along a transverse axis which is normal to the axis of the electromagnet assembly. The assembly is excited by a pulsatory wave to establish a magnetic field in the conduit that is intercepted by the fluid to induce a signal in the electrodes as a function of flow rate.

The harness is constituted by a printed circuit board connected to the electrodes which is disposed in a plane parallel to the electrode axis. The board has a conductive pattern on one side thereof providing wiring from the electrodes to an external converter, the pattern including a loop coaxial with the electromagnet axis, whereby voltages induced therein by the magnetic field are balanced out and no signal is yielded by the harness. Formed on the other side of this board is a conductive layer which serves as an electrostatic shield.

OUTLINE OF DRAWINGS

For a better understanding of the invention as well as other objects and further features thereof, reference is made to the following detailed description to be read in conjunction with the accompanying drawings, wherein:

FIG. 1 is a transverse section taken through an electromagnetic flowmeter of the type disclosed in the Schmoock patent;

FIG. 2 is an elevational view of the spool included in the flowmeter and a wiring harness in accordance with the invention associated therewith;

FIG. 3 is a transverse section taken through the spool to show its relationship to the wiring harness;

FIG. 4 is a plan view of the wiring harness; and

FIG. 5 is a longitudinal section taken through the wiring harness.

DESCRIPTION OF INVENTION

Basic Flowmeter Structure

Referring now to FIG. 1, there is shown an electromagnetic flowmeter of the Schmoock type, the meter including a non-magnetic spool 10 of high strength, preferably fabricated of stainless steel, having circular flanges 10F at either end. The spool is provided with a liner 11 of insulating material to define a flow conduit for the liquid to be metered the direction of flow being along the longitudinal axis X.

The liner is preferably injection molded of a synthetic plastic material such as KYNAR and includes sockets at diametrically-opposed positions to accommodate the electrodes 12 and 13. The electrodes lie along a transverse axis Y which is normal to flow axis X.

Surrounding the lined metal spool 10 and concentric therewith is a split cylindrical housing or casing formed by complementary half-pieces 14A and 14B, the longitudinal edges of these pieces being provided with respective flanges and which are welded, screwed or otherwise joined together to complete the housing. The housing is fabricated of carbon steel or other "soft" ferromagnetic material.

Integral with the housing pieces are two magnet cores 15 and 16 formed of the same cast steel material. The cores are diametrically-opposed and extend along an axis normal to longitudinal axis X, axis X being at right angles to electrode axis Y, so that the three axes are mutually perpendicular. The free ends of cores 15 and 16 are snugly received in circular wells formed in spool 10, thereby exactly locating the spool with respect to the housing pieces.

Cores 15 and 16 are surrounded by solenoid coils 17 and 18, respectively. These are shown schematically; but in practice, the coils are pre-formed so that they can be slipped over the cores to form electromagnets. When excited, these electromagnets establish an electromagnetic field whose lines of flux are at right angles to the direction of fluid flow, whereby when the fluid passing through the spool intercepts this field, a voltage is induced therein which is picked up by the electrodes to provide a signal that is a function of flow rate. The leads for the electrodes and for the electromagnets pass out of the unit to the associated converter assembly through bores 19 and 20 in the upper housing piece 14A.

The opposite ends of the split housing are provided with annular closure plates (not shown) whose inner peripheries mate with the outer peripheries of the end flanges 10F of the spool to define an inner chamber in the space between the spool and the housing.

Integral with upper housing piece 14A and formed of the same material is an external platform 21 for a converter represented schematically by box 22. Also mounted on the platform is the electronic drive circuit 23 for exciting the electromagnet. The converter includes circuits for conditioning the signal derived from the electrodes and all other circuits normally associated with an electromagnetic flowmeter primary to provide an output signal suitable for transmission to a remote station for indicating and recording the metered flow rate and for carrying out process control operations.

Since the lined spool 10 is trapped between cores 15 and 16, and since the electrodes of the meter are received within sockets in the lined spool while coils 17 and 18 are supported on the cores between the housing and the spool, all parts of the meter are properly located and held within the inner chamber when assembling the unit. It then becomes possible to introduce a flowing potting compound of epoxy or other insulating material into the inner chamber through holes 19 and 20 in the housing, and thereby produce, when the compound is cured, a protected, moisture-free unit capable of functioning reliably and efficiently for an indefinite period.

Thus the split housing functions not only as the mechanical support for the converter assembly but it also affords the magnetic flux return path for the electromagnets. Also it provides shielding against electromagnetic, electrostatic and RFI sources external to the meter. Moreover, it provides the means for locating the various sub-assemblies, spools, leads, magnet parts, etc. Not only does this housing afford a weather proof enclosure for the meter, but it acts as a mold for potting the inner chamber.

The concern of the present invention is with the leads from electrodes 12 and 13 which are embedded within the inner chamber and carry the electrode signal to the external converter. If, as shown in FIG. 1, these leads $L_1$ and $L_2$ are asymmetrically disposed with respect to the axis of symmetry Z of the electromagnetic assembly formed by the electromagnets, then an unwanted spurious signal will be generated. Since the assembly is excited by a pulsatory wave, the voltage induced in these leads by the pulsatory magnetic field will have changing values, as a consequence of which a signal will be generated even in the absence of fluid flow, and it becomes necessary therefore, to compensate for this spurious signal to provide a zero output at zero flow.

The present invention provides a wiring harness for the electrodes which is formed on one side of a printed circuit board embedded in the inner chamber, which harness balances out the voltages induced in the leads to provide zero signal at non-flow conditions without the need for compensation. An electrostatic shield formed on the other side of the board acts to prevent electrostatic pick-up.

The Wiring Harness

Referring now to FIGS. 2 and 3, it will be seen that terminals 12t and 13t of the electrodes 12 and 13 mounted at diametrically-opposed positions on spool 10 are connected by bus bars 24 and 25 to a printed circuit board 26 which lies in a plane parallel to the electrode axis Y, the bus bars being at right angle to the plane of the board.

Referring now to FIGS. 4 and 5, the wiring harness is carried by printed circuit board 26 coated with copper on both sides. Side 26F of the board, which faces the electrodes, is etched to define the printed circuit pattern. The rear side 26R of the board remains essentially solid copper and functions, therefore, as an electrostatic shield. The shield side is connected to a terminal 27 on the printed circuit side which is connected by lead $L_3$ to ground through the outer shielding tube 28 of a cable 29 for connecting the wiring harness to the external converter 22.

Printed circuit board 26 has a central hole 30 therein to permit the insertion therethrough of magnet core 15 (or 16). The printed circuit includes a first input terminal 31 adjacent one end of the board to which is connected bus bar 25. Terminal 31 is connected by a straight line conductor 32 to one side of a conductive circular major loop 33 which is concentric with hole 30, the other side of the loop being connected by a continuation 32C of the straight line conductor to one side of an oblong conductive minor loop 34 to whose other side is connected a first output terminal 35 to which a cable lead $L_4$ is soldered. First output terminal 35 is therefore connected to electrode 12 of the meter via minor loop 34, straight line conductor 32C, major loop 33, straight line conductor 32, terminal 31 and bus bar 25.

Bus bar 24 from electrode 13 is soldered to one end (36in) of a terminal 36 which is an oblong double terminal. The other end (36out) of terminal 36 has a cable lead $L_5$ soldered thereto.

The wires $L_4$ and $L_5$ in the shielded cable 29 are twisted; hence voltages induced therein by the magnetic field are cancelled out. And since the connection between electrode 13 and the cable wire $L_5$ via terminal 36 is symmetrical in the plane of magnetic flux, virtually no voltage is induced therein. Our concern, therefore is the voltage induced in the relatively extended connection between electrode 12 and the cable wire $L_4$.

The configuration of the printed circuit is such as to cancel out the effect of voltages induced in the connection between electrode 12 and the cable wire $L_4$. The major loop 33 which is concentric with the axis Z of the electromagnet assembly has upper and lower half sections on either side of the straight line conductor formed by sections 32 and 32C; hence voltages induced in each half cancel each other. A similar action occurs in the minor loop 34.

Thus while the leads from the electrodes formed by the wiring harness are of disparate length, the arrangement is such as to virtually eliminate the influence of the magnetic field on the harness. In those structures in which the core of the meter does not go through the circuit board, the major loop 33 may be replaced with a straight wire, cancellation of spurious signals then being effected by minor loop 34.

While there has been shown and described a preferred embodiment of an Electrode Wiring Harness for Magnetic Flowmeter in accordance with the invention, it will be appreciated that many changes and modifications may be made therein without, however, departing from the essential spirit thereof. For example, instead of a rigid printed circuit board, other forms of printed circuits may be used; for these are potted within the inner chamber and their disposition is thereby stabilized.

I claim:

1. An electrode harness for an electromagnetic flowmeter provided with a lined, non-magnetic spool which defines a flow conduit for the fluid to be metered, a pair of electrodes mounted on said spool at diametrically-opposed positions along an axis normal to the axis of symmetry of an electromagnetic assembly which establishes a pulsating magnetic field in the conduit whereby the fluid intercepting this field induces a signal in the electrodes which is conducted by the harness to an external converter; said harness comprising a printed circuit having a conductive pattern thereon providing wiring from the electrodes to the converter in a configuration causing voltages induced in the wiring by the magnetic field to cancel out, whereby the signal fed to the converter is free of spurious components.

2. An electrode harness as set forth in claim 1, wherein said printed circuit is formed on one side of a printed circuit board positioned in a plane parallel to-/and symmetrical with the electrode axis.

3. An electrode harness as set forth in claim 2 for a flowmeter in whose electromagnetic assembly is constituted by a pair of electromagnets each formed by a bar core surrounded by a coil, the cores being disposed at diametrically-opposed positions on said spool along said axis of symmetry.

4. An electrode harness as set forth in claim 3, wherein said board has an opening therein to admit the core of one of said electromagnets.

5. An electrode harness as set forth in claim 4, wherein the printed circuit on said board is on a side thereof facing said electrodes, the other side of the board having an electrostatic shield thereon.

6. An electrode harness as set forth in claim 5, wherein said printed circuit on said board has adjacent one end thereof a first input terminal connected by a bus bar at right angles to this board to one of the electrodes, and adjacent the other end a second input terminal connected by a bus bar at right angles to the board to the other electrode.

7. An electrode harness as set forth in claim 6, wherein said printed circuit has a straight line conductor extending between said first input terminal to a first output terminal adjacent the other end of the board, a conductive main loop being interposed in said straight line conductor, said main loop surrounding said opening.

8. An electrode harness as set forth in claim 7, wherein said second input terminal is included on said board in a dual terminal having a second output terminal.

9. An electrode harness as set forth in claim 7, wherein said dual terminal on said board is surrounded by a minor loop interposed between said first output terminal and said straight line conductor.

10. An electrode harness as set forth in claim 9 in combination with a cable to couple said harness to said converter, said cable having an outer shielding to be connected to said electrostatic shield and two twisted inner lines, one connected to said first output terminal and the other to said second output terminal.

* * * * *